United States Patent [19]

Tsuchiya et al.

[11] Patent Number: 5,666,549
[45] Date of Patent: Sep. 9, 1997

[54] METHOD AND SYSTEM FOR PROCESSING A DOCUMENT TRANSMITTED VIA FACSIMILE IN AN INITIALLY INPUT FORM STORED IN A KNOWLEDGE BASE

[75] Inventors: Masayuki Tsuchiya, Hiratsuka; Hiroshi Fujise, Yokohama; Masato Teramoto, Nagoya, all of Japan

[73] Assignees: Hitachi, Ltd., Tokyo; Hitachi Software Engineering Co., Ltd., Yokohama, both of Japan

[21] Appl. No.: 386,182

[22] Filed: Feb. 9, 1995

Related U.S. Application Data

[63] Continuation of Ser. No. 29,061, Mar. 10, 1993, abandoned, which is a continuation-in-part of Ser. No. 885,775, May 20, 1992.

[30] Foreign Application Priority Data

Mar. 10, 1992 [JP] Japan .................... 4-051310

[51] Int. Cl.⁶ .................................................. G06F 13/00
[52] U.S. Cl. .................... 395/761; 364/225.6; 364/943
[58] Field of Search ............................... 382/61; 358/464

[56] References Cited

U.S. PATENT DOCUMENTS

| | | | |
|---|---|---|---|
| 4,922,348 | 5/1990 | Gillon et al. | 358/407 |
| 4,933,979 | 6/1990 | Suzuki et al. | 382/173 |
| 5,040,226 | 8/1991 | Elischer et al. | 382/7 |
| 5,091,790 | 2/1992 | Silverberg | 358/434 |
| 5,133,026 | 7/1992 | Fujiwara et al. | 382/61 |
| 5,140,650 | 8/1992 | Casey et al. | 382/61 |
| 5,247,591 | 9/1993 | Baran | 382/61 |
| 5,293,429 | 3/1994 | Pizano et al. | 382/24 |
| 5,317,646 | 5/1994 | Sang et al. | 382/9 |

FOREIGN PATENT DOCUMENTS

| | | |
|---|---|---|
| 0262462 | 4/1988 | European Pat. Off. . |
| 0398184 | 11/1990 | European Pat. Off. . |
| 0407935 | 1/1991 | European Pat. Off. . |
| 4216893 | 11/1992 | Germany . |
| 2192244 | 7/1990 | Japan . |

*Primary Examiner*—David Y. Eng
*Attorney, Agent, or Firm*—Antonelli, Terry, Stout & Kraus, LLP

[57] ABSTRACT

A document processing method and system are provided in which data is inscribed as handwritten information on a blank form in a document form hitherto used or a blank form for a document produced by a word processor or the like. The blank form with the handwritten information data is facsimile-input and is transmitted to a computer which in turn receives the data directly and recognizes the received data to process the document. Initially, the contents or format of a blank form are read to obtain and store information regarding ruled lines and handwritten character input areas. Upon execution of document processing, an input document image received via facsimile is searched for reference ruled lines on the basis of the ruled line information initially stored to positionally adjust the document image and ruled line images in handwritten character input areas are erased from the adjusted document image on the basis of the handwritten character input area information initially stored to recognized handwritten characters. A function of returning the result of recognition or the result of processing by the computer to a sender facsimile or a function of eliminating improper facsimile transmission may be provided by receiving a sender facsimile number as data upon reception of the facsimile document image and storing it or comparing the received number with transmission-allowed facsimile numbers previously registered.

20 Claims, 19 Drawing Sheets

HANDWRITTEN CHARACTER INPUT
AREA INFORMATION          1501

| NAME | START(X,Y), END(X,Y) | NUMBER OF DIGITS | ATTRIBUTE |
|---|---|---|---|
| CODE 1 | (22, 32) (26, 36) | 4 | ALPHABETIC CHARACTER |
| QUANTITY 1 | (28, 38) (32, 42) | 4 | NUMERIC CHARACTER |
|  |  |  |  |
|  |  |  |  |

FIG. 16

RECOGNITION RESULT

| STATE | NAME | NUMBER OF DIGITS | CODE DATA | | |
|---|---|---|---|---|---|
| | 1601 | 1603 | 1604 | 1605 | |
| 0 | 045821211 | CODE 1 | 3 | 1 2 3 | CODE 2 | 3 | A B C |

1602

| 1 | 045821211 | CODE 1 | 3 | 1 2 ? | CODE 2 | 3 | ? B ? |

1606

METHOD AND SYSTEM FOR PROCESSING A DOCUMENT TRANSMITTED VIA FACSIMILE IN AN INITIALLY INPUT FORM STORED IN A KNOWLEDGE BASE

CROSS-REFERENCE TO RELATED APPLICATIONS

The present application is a continuation of U.S. patent application Ser. No. 08/029,061 filed Mar. 10, 1993, now abandoned which is a continuation-in-part of U.S. patent application Ser. No. 07/885,775 filed May 20, 1992.

This application relates to applications U.S. Ser. No. 07/550,521 filed Jul. 10, 1990 now U.S. Pat. No. 5,228,100 and U.S. Ser. No. 07/689,071 filed Oct. 19 1990 now U.S. Pat. No. 5,231,579. The disclosures of these applications are incorporated herein by reference.

BACKGROUND OF THE INVENTION

The present invention relates to a method and system in which information data such as a document or slip of paper transmitted via facsimile through a communication line is processed by a computer.

In the conventional method of inputting data onto a blank form or document via a computer, the data is input in such a manner that an operator keys-in data from a console device while observing contents being input into the blank form or the data is input using optical character recognition (OCR) equipment. Data from a remote place is input in such a manner that a document is sent by mail or the like or by a messenger and a key-in operation is thereafter made while observing the received document. Alternatively, the data from the remote place is input in such a manner that the document is transmitted via facsimile and the receiving side performs a key-in operation while observing contents being printed out by facsimile terminal equipment provided on the receiving side or makes an input operation using OCR equipment after transcription of the data onto a blank form for the exclusive use of OCR.

When there is a large amount of data, the conventional data key-in method requires many hands and a large number of steps since the data must be input by human operators performing manual operations. Especially, when data from remote places is collected to perform a centralized processing, the data from the remote places are sent by mail or the like or by messengers since it is not possible to make a data key-in operation if the data to be input is not found at the place where the data is to be inputted. Therefore, there are problems that the cost of transport becomes great and a real-time processing of information is not possible. Also, though there is a method in which information from the remote place is received by facsimile terminal equipment and a key-in operation is made while observing information printed out by the facsimile terminal equipment, the quality of facsimile print-out is poor in many cases and hence there results erroneous input to the computer. In addition, a large number of steps are required since such a method requires the data key-in operation. Further, though there is a method which uses OCR equipment, much labor or time is required since data is input into a blank form for the exclusive use of OCR and is thereafter subjected to OCR processing. Recently, a system has been developed in which data described on a blank form for the exclusive use of OCR is transmitted from facsimile terminal equipment and the received data is processed by a computer. In this system, however, blank forms for the exclusive use of OCR are required in place of hitherto used document forms or blank forms. Accordingly, there are problems that a change of the form of business affairs is required and an expenditure is required for producing the blank forms for the exclusive use of OCR. Further, since the data must be described by handwritten within a frame or area of the blank form for OCR, a large load is imposed on a user.

SUMMARY OF THE INVENTION

An object of the present invention is to provide a method and system in which, rather then a special blank form, a general blank form hitherto used or a blank form produced by a word processor or the like can be used, and such a blank form (or document) having data input thereon is transmitted via facsimile and is then processed by a computer to generate a data base concerning the described data.

Another object of the present invention is to provide a document information processing method and system in which data from remote places can be collected at a low cost and at a real time in such a manner that a blank form having a format printed or input thereon is used as a document on which handwritten input is made, data is described by handwritten on the blank form or document and the document with handwritten data is transmitted via facsimile to a computer which in turn receives the facsimile image directly and recognizes the handwritten data for code data processing.

A further object of the present invention is to provide a document information processing method and system having a function for transmitting to a sender facsimile for confirmation or retransmission request due to the transmission erroneous data and so on, an image deviation adjusting function, a reverse direction input correcting function and a reception-allowed facsimile number defining function in addition to the function of recognition as mentioned, thereby making it possible to easily perform processing of an input from a remote place easily and with erroneous recognition and erroneous reception minimized.

To that end, according to one aspect of the present invention, there is provided a document processing system for processing a facsimile-transmitted document by a computer, in which, initially, the contents or format of a blank form or document which include no handwritten data thereon are read to determine information regarding ruled lines and format characters or terms and information regarding handwritten character input or entry areas, and to store the obtained information. Thus, there is initially prepared a knowledge base concerning the format of a document to be received. Upon execution of document processing, an input document image from facsimile is searched for reference ruled lines on the basis of the ruled line information stored in the knowledge base to make a positional and/or directional adjustment (proper registration/aligning) of the document image and ruled line images in handwritten character input areas are erased from the adjusted document image on the basis of the handwritten character input area information stored in the data base to recognize handwritten characters, thereby producing a data base concerning document data. According to another aspect of the present invention, the document processing system further includes means for receiving an equipment number as data upon reception of the document image via facsimile and storing the received equipment number and means for returning the result of processing by the computer to the sender facsimile. The system may include means for comparing a facsimile number initially registered and a facsimile number received as the equipment number. The system may include means for detecting a reverse direction of the document image on the basis of the ruled line information initially stored and rotating the image by 180°. The system may include buffer means such as a disk device for storing input information receive via facsimile.

With the above construction, by searching an input document image that is received via facsimile for reference ruled lines on the basis of ruled line information stored in a knowledge base to make a positional adjustment of the document image, it is possible to compensate for a deviation of the image caused by, for example, a difference in the type of or manufacture of the facsimile terminal equipment, thereby correctly setting or establishing handwritten character input areas. Also, the efficiency of recognition can be improved by making the recognition of handwritten characters after ruled line images in handwritten character input areas have been erased to put only the handwritten characters into relief. By using an equipment number received or input as data upon reception of an image via facsimile, it is possible to return image data to the sender facsimile with a request for retransmission when there is a read error or an unrecognizable character. Further, the provision of a function for transmitting the result of a processing of received image data by a computer to each facsimile enables a transmission/reception system which processes data from a remote place. Also, erroneous data can be determined by comparing a facsimile number initially registered and a facsimile number received as an equipment number. By detecting a reverse direction of a received image on the basis of ruled line information initially stored as a knowledge base and rotating the image by 180° to make correct recognition possible, it is possible to reduce a load upon input from each facsimile. By storing received information once in a buffer such as a disk device and then fetching the information sequentially therefrom, it is possible to reduce a time for use of a telephone line for facsimile transmission, thereby shortening a busy time of the telephone line.

BRIEF DESCRIPTION OF THE DRAWINGS

FIG. 16 shows a format of the recognition result on a display screen;

DESCRIPTION OF THE PREFERRED EMBODIMENT

Embodiments of the present invention will now be explained in detail with reference to the accompanying drawings.

Figure 1:
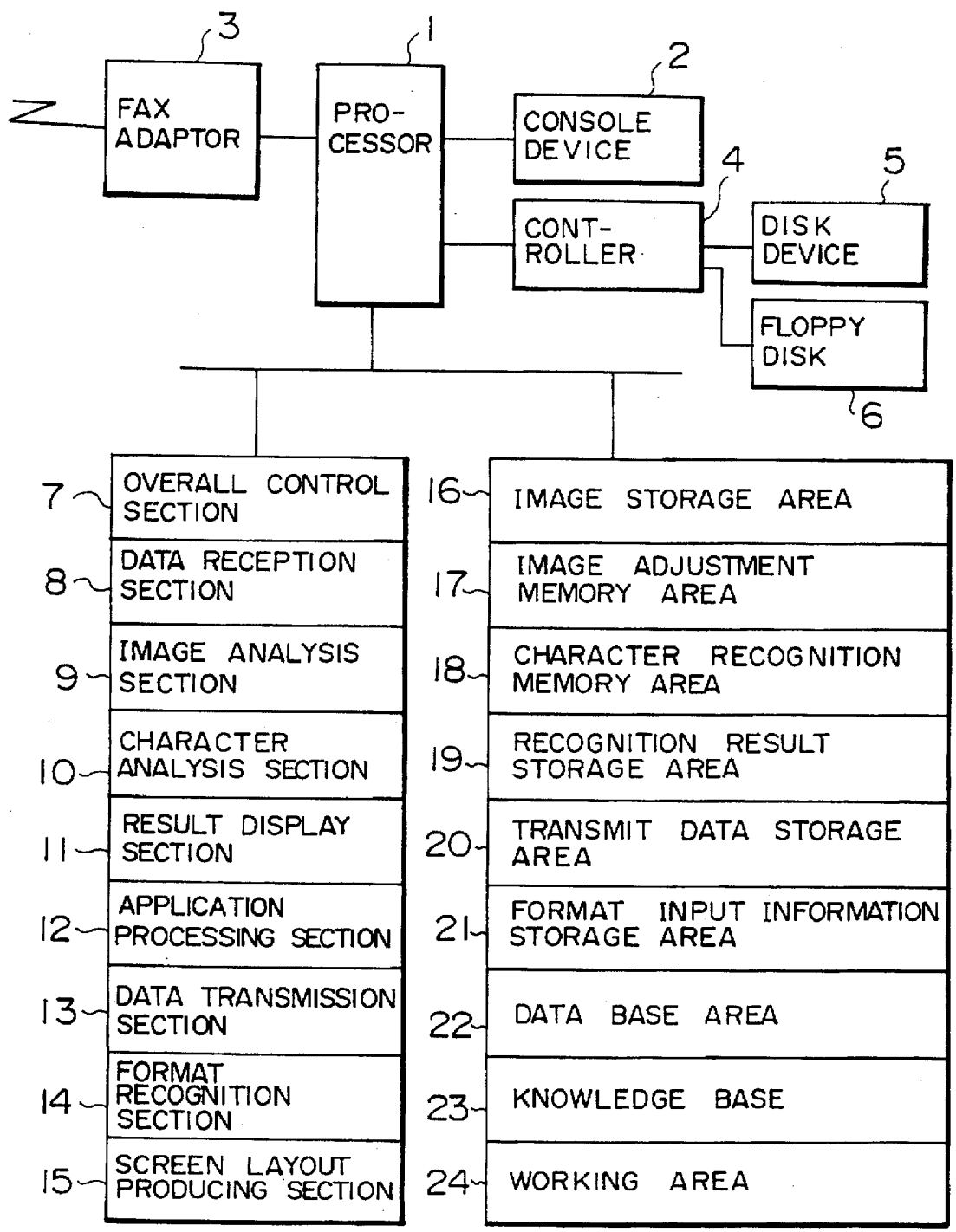
FIG. 1 is a block diagram showing the construction of the whole document processing system according to an embodiment of the present invention.

FIG. 1 shows, in block diagram, the construction of the whole facsimile data image processing system according to an embodiment of the present invention. Processor 1 for making an overall control is connected to a console device 2 used for the input of instructions by an operator and for displaying or printing the result of recognition of an image received via facsimile, and a facsimile adaptor 3 for receiving a data image such as a document or form via facsimile. A disk device 5 and a floppy disk 6 for storing code data as the recognition result are connected to the processor 1 through the controller 4.

Under control or management by an overall control section 7, the processor 1 first utilizes data reception section 8 to receive a data image via facsimile from the facsimile adaptor 3 and the received data image is stored into an image storage area 16. An image data analysis section (or program) 9 uses an image adjustment memory area 17 to adjust the deviation/direction of the image. A character analysis section (or program) 10 uses a character recognition memory area 18 to recognize data from the adjusted image and stores the result of recognition into a recognition result storage area 19. A result display section 11 displays the received image and code data of the recognition result in accordance with a screen display format stored in a format input information storage area 21 so that the recognition result is subjected to confirmation or correction by a user.

Thereafter, the code data of the recognition result is stored into a data base area 22. An application processing section 12 uses data stored in the data base area 22 to perform an application processing such as business related processings. A data transmission section 13 sends back erroneous data or the result of application processing to the sender facsimile from a transmit data storage area 20. In order to perform the above processings, it is necessary to produce or generate definition information. Based on a blank form input from the facsimile adaptor 3 and having no data inscribed thereon or a format image input from the floppy disk 6 such as a word processor floppy disk (FD), a format recognition section 14 produces ruled line information, reference line information and handwritten character input area information by means of a knowledge base 23 and by use of a working area 24. A screen layout producing section 15 produces a format to be displayed on a display screen and stores it into the format input information storage area 21.

Figure 2:
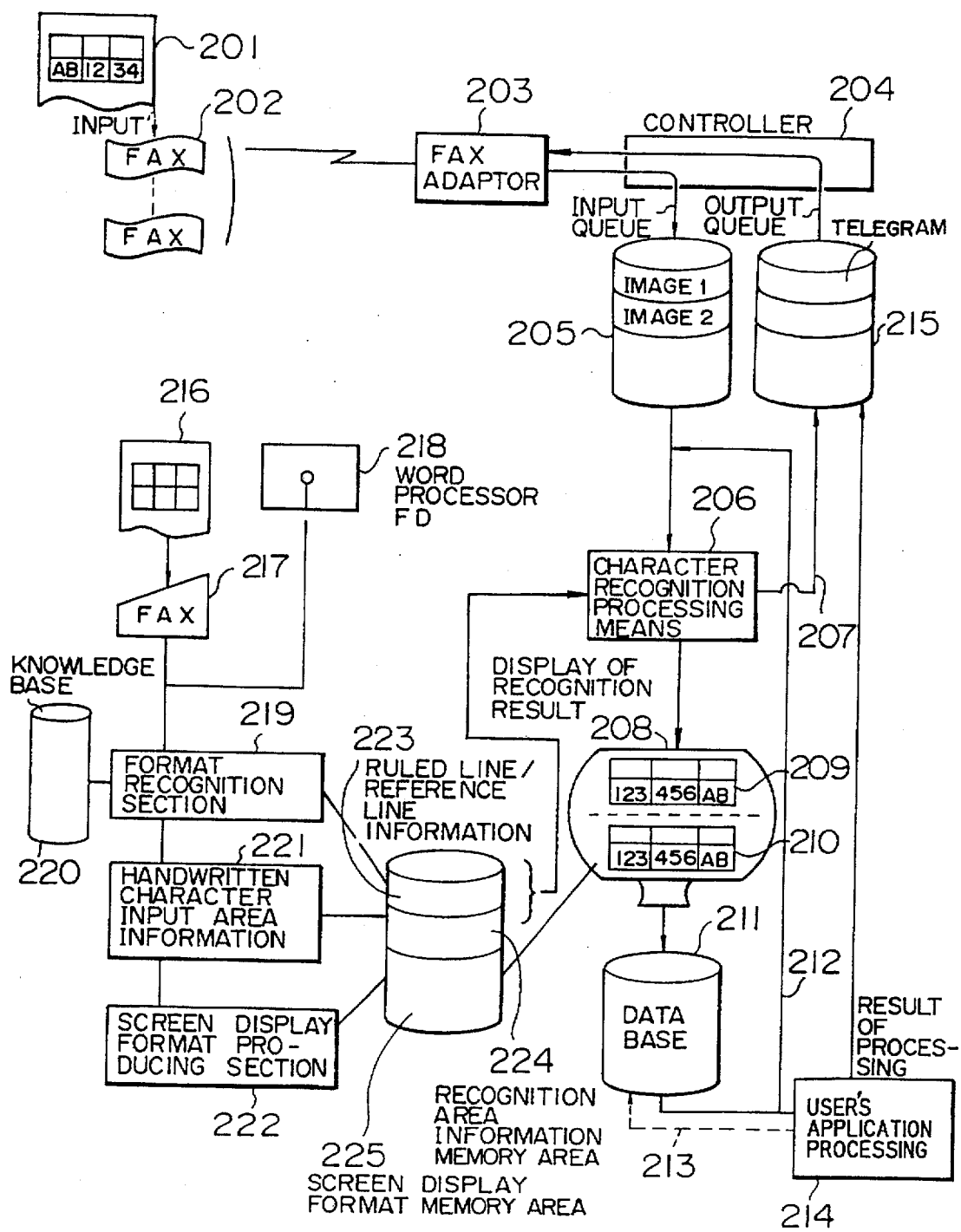
FIG. 2 is a diagram showing the outline of a processing performed by the system shown in FIG. 1.

FIG. 2 shows the sequence of processing in the system shown in FIG. 1. The definition of processing is made by inputting a document 216 with no information written thereon from a FAX 217 or a format described in a word processor floppy disk (FD) 218 to recognize ruled lines and described terms by a format recognition section (or program) 219 by means of a knowledge base (or file) 220, thereby producing handwritten character input area information 221 (or information of input or entry areas for handwritten characters to be recognized upon execution).

A screen display format producing section (or program) 222 produces a screen for confirmation/correction for the result of recognition. The format recognition, the term recognition and the production of confirmation/correction screen are disclosed by the above-mentioned U.S. Ser. No. 07/550,521 which correspond to Japanese Patent Applications No. 01-202794 and No. 01-175469 and European Patent Application No. 90113076.5 filed Jul. 9, 1990 and the above-mentioned U.S. Ser. No. 07/689,071 which corresponds to Japanese Patent Application No. 02-67149 and German Patent Application P4091841.6 filed Oct. 19, 1990. Recognized rule line information, reference line information and reverse direction check information are stored into a ruled line/reference line information memory area 223, handwritten character input area information is stored into a recognition area information memory area 224, and a screen display format is stored into a memory area 225. A document or blank form including handwritten characters 201 described thereon is input from a facsimile 202. A document image is received by a facsimile adaptor 203 and is stored into an input queue 205 through a controller 204.

Thus, images from a plurality of facsimiles are stored in the input queue 205 which is formed by an input buffer device. Handwritten character recognition processing means 206 fetches one image from the input queue 205 and performs a processing for adjustment for any deviation of the blank form and for correction of any reverse direction thereof on the basis of the ruled line/reference line information stored in the memory area 223 and the recognition area information stored in the memory area 224 to recognize handwritten characters. When an unrecognizable character is detected, the result of recognition is set into an output queue 215 (which is formed by an output buffer device) and is returned to the sender facsimile. Code data of the result of recognition is displayed as the recognition result on a display screen 208. The received image and the characters as the result of recognition are displayed respectively on upper and lower portions 209 and 210 of the display screen 208 in accordance with the screen display format stored in the memory area 225 to allow an operator to make confirmation/correction for characters or the like which are the result of recognition. Document information as the recognition result after confirmation/correction is stored in a form of code data into a data base 211. A similar processing is repeated for the next image from the input queue 205. In user's application processing 214, work or business related processing are performed using the data base 211, and the result of user's application or business related processing is set into the output queue 215 and is returned to the corresponding sender facsimile. Optionally, means (or area) for storing uncertain or unrecognizable data in the recognition result may be provided between the character recognition processing means 206 and the display means 208 so that the output of the processing means 206 is directly stored into the data base 211 by change-over from semi-automation to automation.

Figure 3:
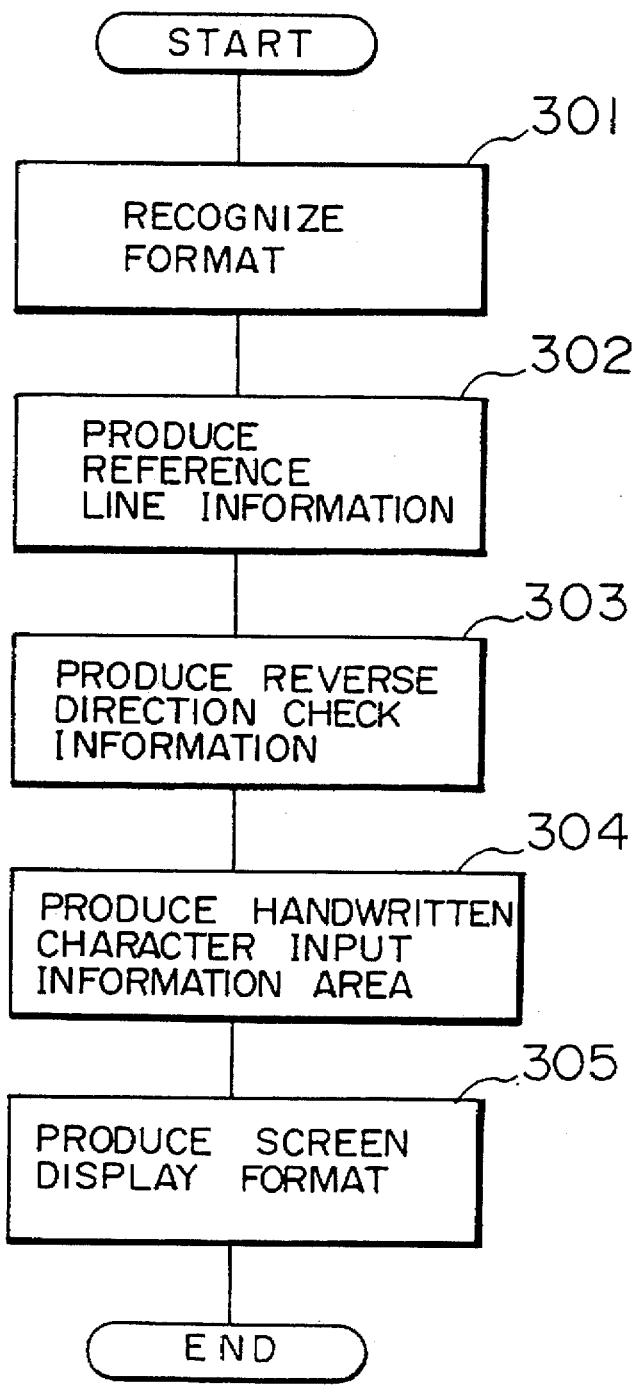
FIG. 3 is a flow chart of format recognition upon definition.

FIG. 3 shows a flow chart of format recognition upon definition. In step 301, ruled lines and terms are recognized using the techniques disclosed by the above mentioned U.S. Ser. Nos. 07/550,521 and 07/689,071 to produce ruled line information. Thereafter or in a step 302, reference line information is produced from the ruled line information. In step 303, reverse direction check information is produced from the ruled line information. Thereafter in step 304, handwritten character input area information is produced from the ruled line information by using the techniques disclosed by the above-mentioned U.S. Ser. Nos. 07/550,521 and 07/689,071. In step 305, a screen display format for display of the recognition result on a display screen is produced.

Figure 4:
FIG. 4 shows the format of ruled line information.

FIG. 4 shows a format of ruled line information. Start and end positions of each ruled line are set in an area 401, the width of the ruled line is set in an area 402 and the length of the ruled line is set in an area 403.

Figure 5:
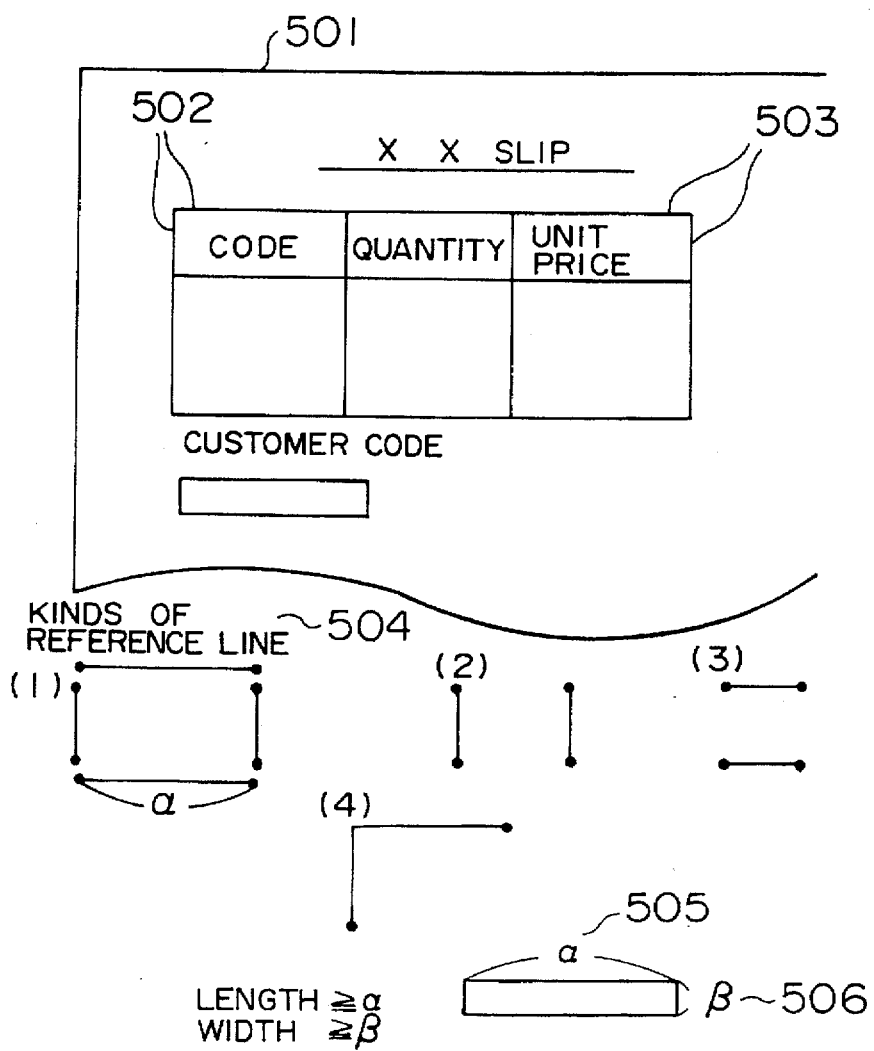
FIG. 5 is a diagram for explaining the setting of reference lines.

FIG. 5 is a diagram showing the setting of reference lines. Ruled lines, which form reference lines, are selected from among ruled lines of a document 501. The reference lines selected include ruled lines which exist in the document and at the outermost possible portions thereof and have a length equal to or larger than a predetermined value 505 or $\alpha$ and a width equal to 5 or larger than a predetermined value 506 or $\beta$. Taking the distortion of an image into consideration, the reference line is set as one selected from four kinds (1) to (4) as shown by 504. The selection is made in accordance with the format of the document.

Figure 6:
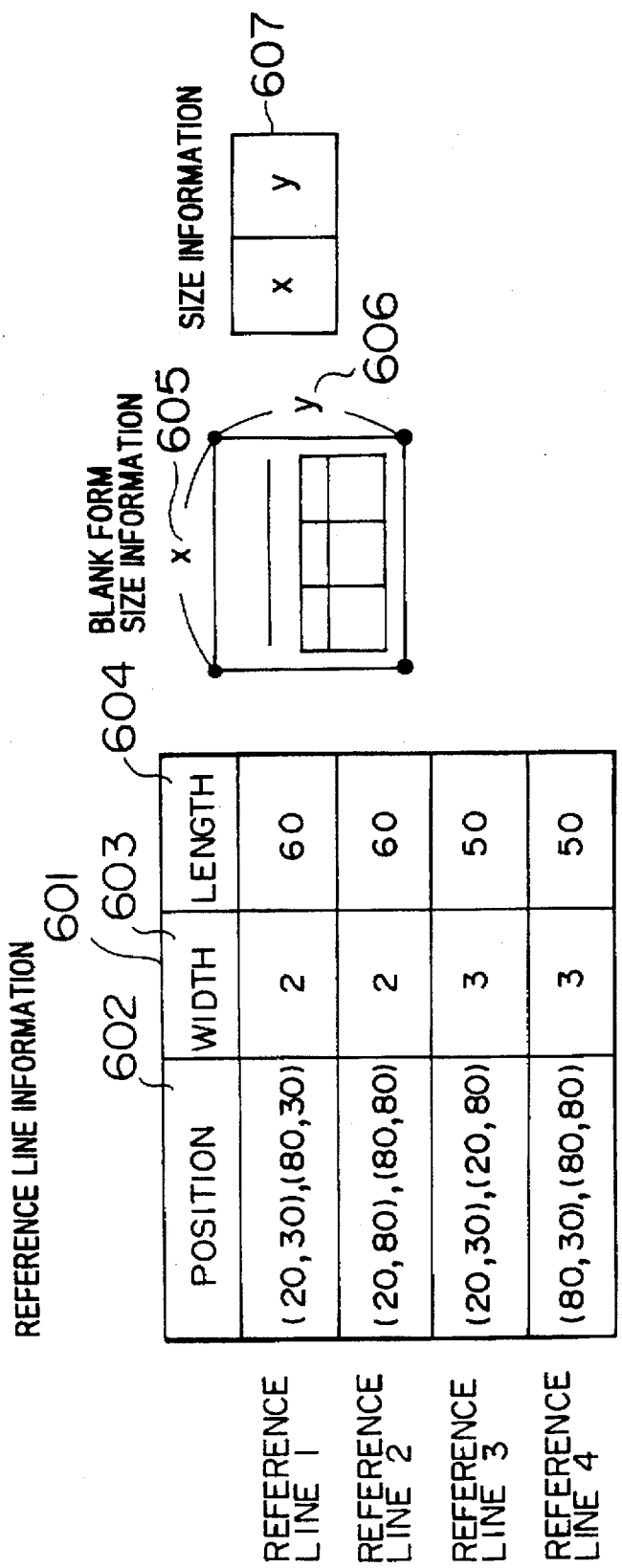
FIG. 6 is a diagram showing the contents of reference line information.

FIG. 6 shows the contents of reference line information. Reference line information 601 includes position information 602, width information 603 and length information 604. The size of the blank form, including vertical and lateral lengths 605 and 606 thereof, is stored as blank form size information 607.

Figure 7:
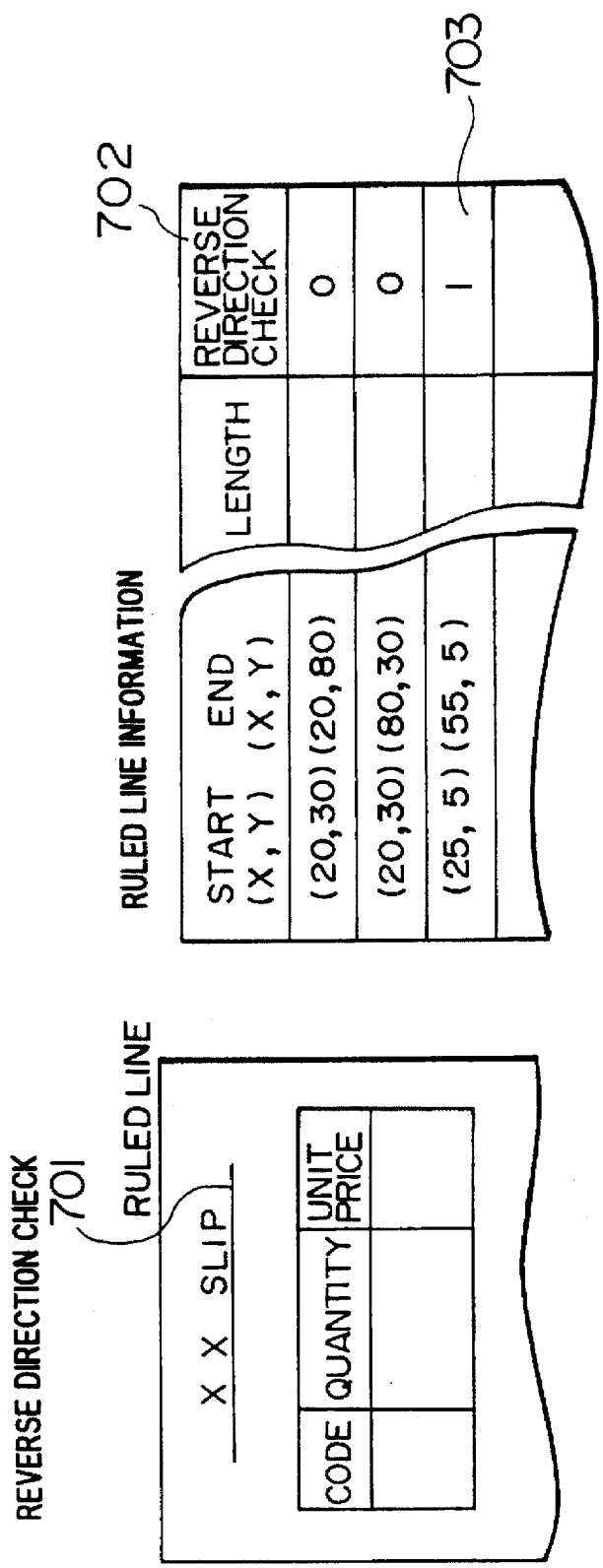
FIG. 7 is a diagram for explaining the production of reverse direction check information.

FIG. 7 is a diagram for explaining the production of reverse direction check information. A ruled line for reverse direction check is indicated by one vertical or lateral ruled line 701 which is the outermost one of ruled lines of the document format and does not intersect the other ruled lines. Reverse direction check information is included as check information 702 in the ruled line information and is marked or flagged as shown by reference numeral 703.

Figure 8:
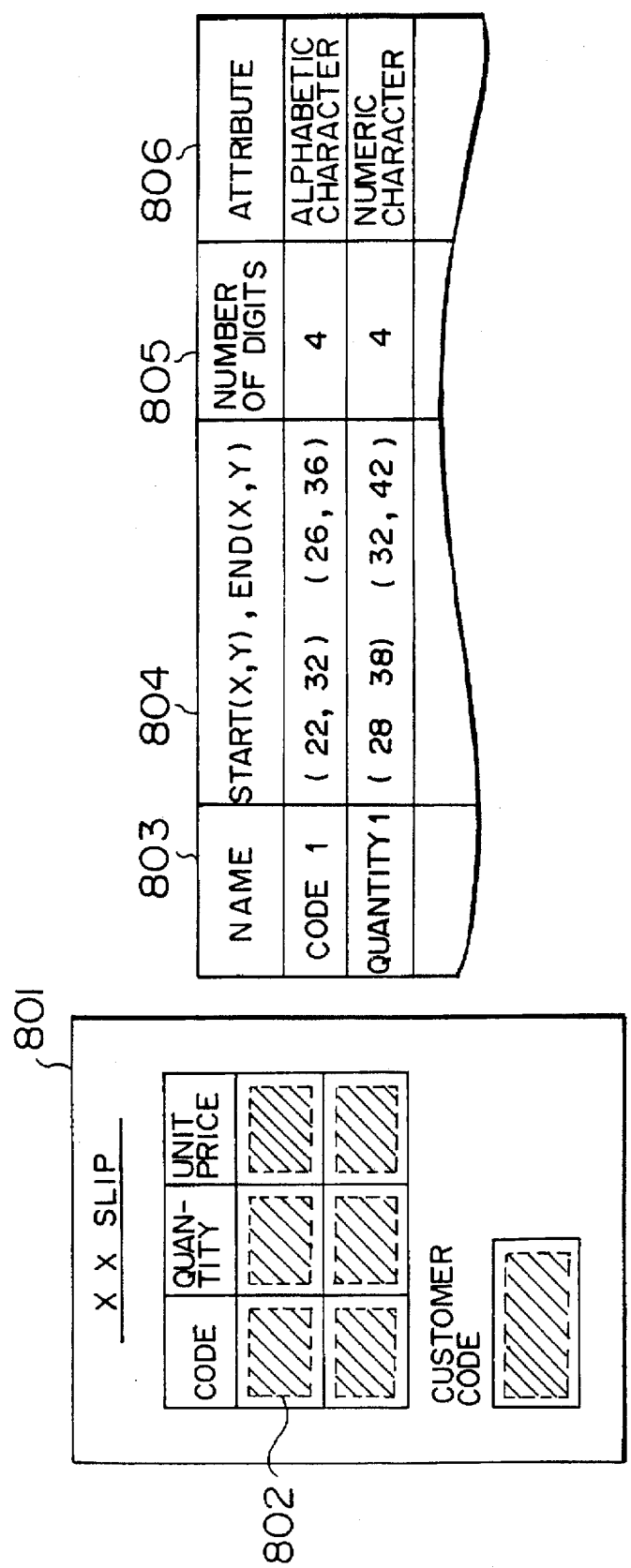
FIG. 8 is a diagram for explaining the production of handwritten character input area information.

FIG. 8 is a diagram for explaining the production of handwritten character input area information. Areas as shown by reference numeral 802 are produced on the basis of terms of a blank form 801. Produced handwritten character input area information includes area name 803, area position 804, the number 805 of digits and attribute 806. The handwritten character input area information can be produced by the techniques disclosed by the above-mentioned U.S. Ser. Nos. 07/550,521 and 07/689,071.

Figure 9:
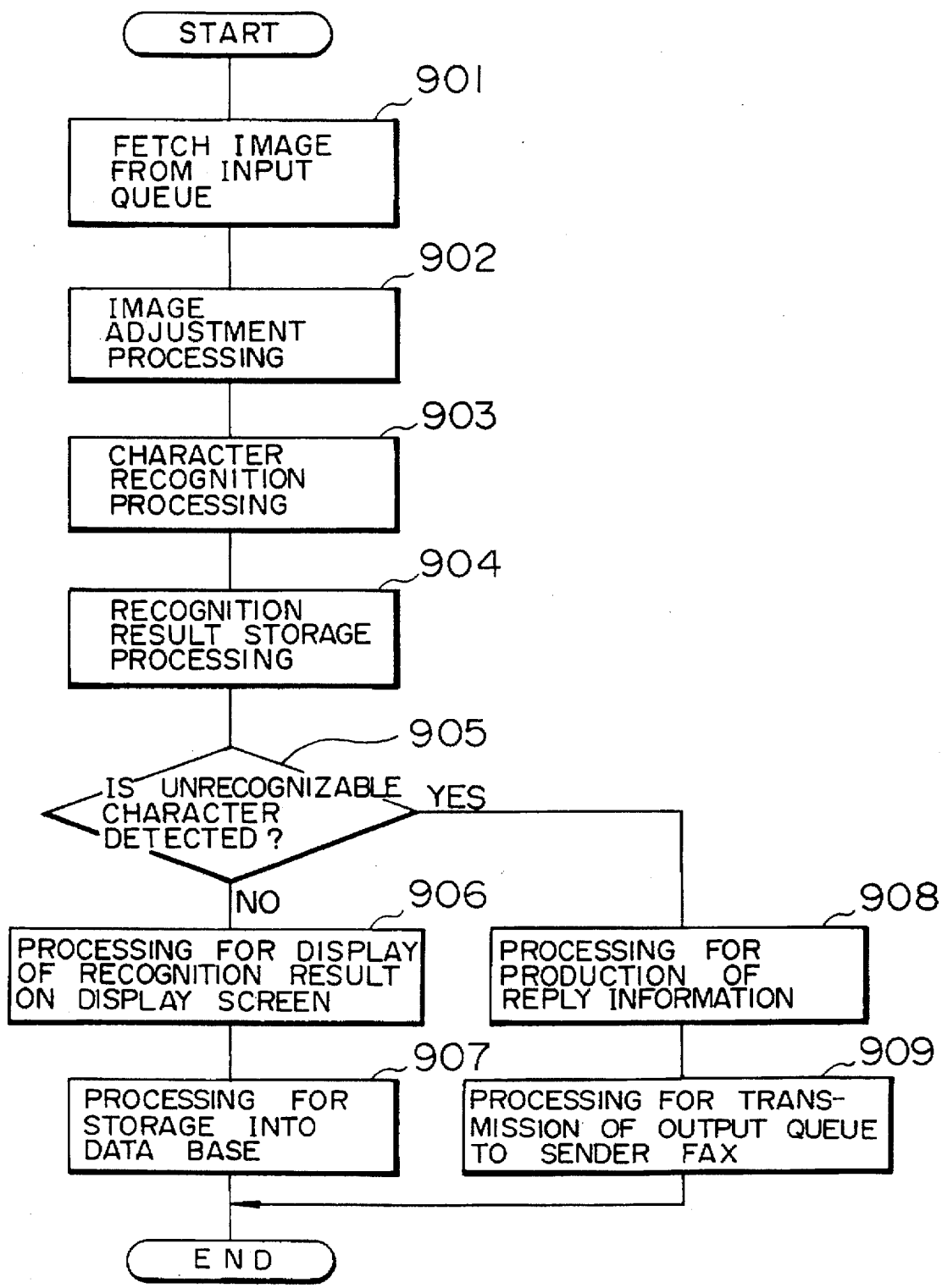
FIG. 9 is a flow chart of a processing for recognizing handwritten characters from an input image from a facsimile transmission and converting the recognized characters into code data.

FIG. 9 shows a flow chart of a processing for recognizing the input images of handwritten characters from facsimile to make conversion into code data.

In step 801, an image received by the facsimile adaptor and stored in the input queue is fetched from the input queue. In step 902, image adjustment processing is performed on the basis of the stored reference line information and reverse direction check information. In step 903, the images of described or handwritten characters are extracted from the adjusted image on the basis of the handwritten character input area information stored to recognize characters. At this time, ruled line images such as digit separation in the handwritten character input areas are removed through the matching of the handwritten character input area information with the ruled line information. In a recognition result storage processing of step 904, recognized code data is stored into a working area. In the case where there is an unrecognizable character (step 905), a reply (or transmit) information producing processing is performed in step 908 to return the image and the recognition result to the sender facsimile with a request for retransmission. A user can make correction and re-input (or restore) while observing the contents being retransmitted. In this case, there is employed a construction in which the number of times of re-input is counted in order to stop returning in spite of the existence of an unrecognizable character if it reaches a certain value. In step 906, the recognition result is displayed on the display screen to make confirmation/correction while watching the image. In step 907, the confirmed/corrected code data is stored into a data base.

Figure 10:
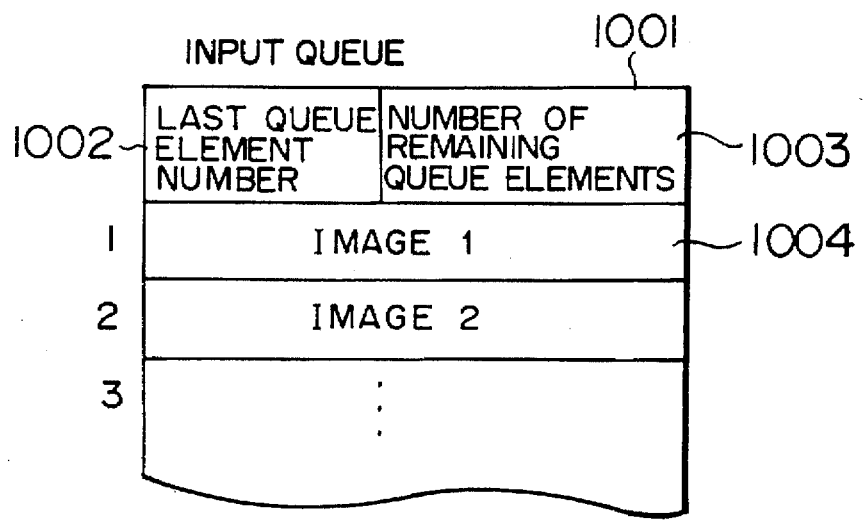
FIG. 10 is a diagram showing the contents of an input queue.

FIG. 10 shows the contents of an input queue. A queue 1001 includes at a leading portion a field 1002 representing the queue element number of the last queue element which is presently registered and a field representing the number of remaining queue elements which can be registered. Image data is stored in a field 1004.

Figure 11:
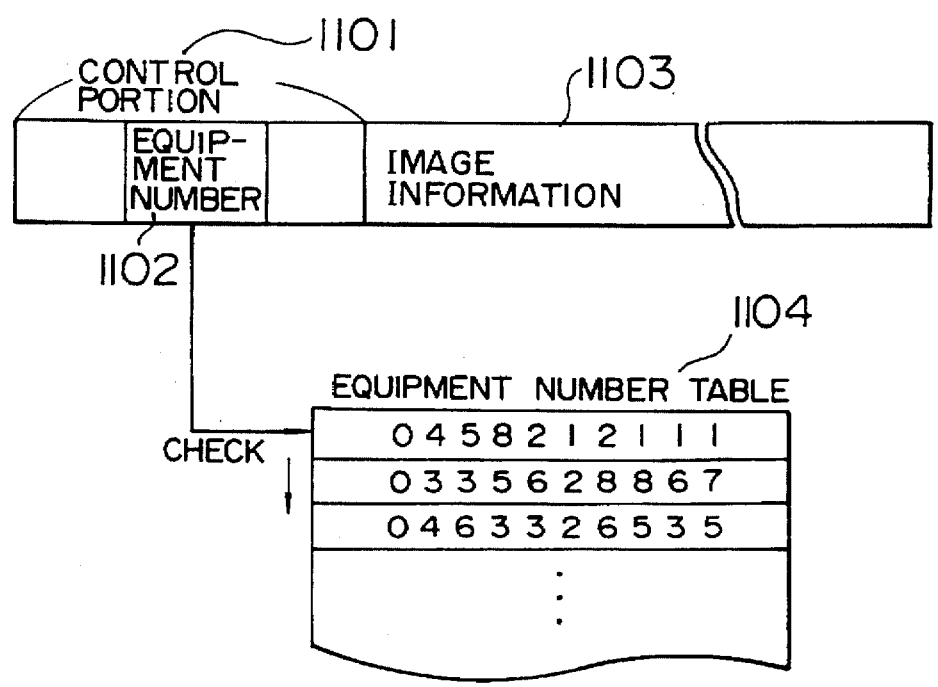
FIG. 11 is a diagram showing an input image format.

FIG. 11 shows an input image format. The format has a control portion 1101 and an image information portion 1103. The control portion 1101 includes, for example, an equipment number 1102. If one's own facsimile number is registered as the equipment number of a sender facsimile, an equipment number included in the control portion 1101 or a facsimile number can be recognized. Erroneous input can be checked, for example, by possessing a transmission-allowed facsimile or equipment number table 1104 as shown in FIG. 11.

Figure 12:
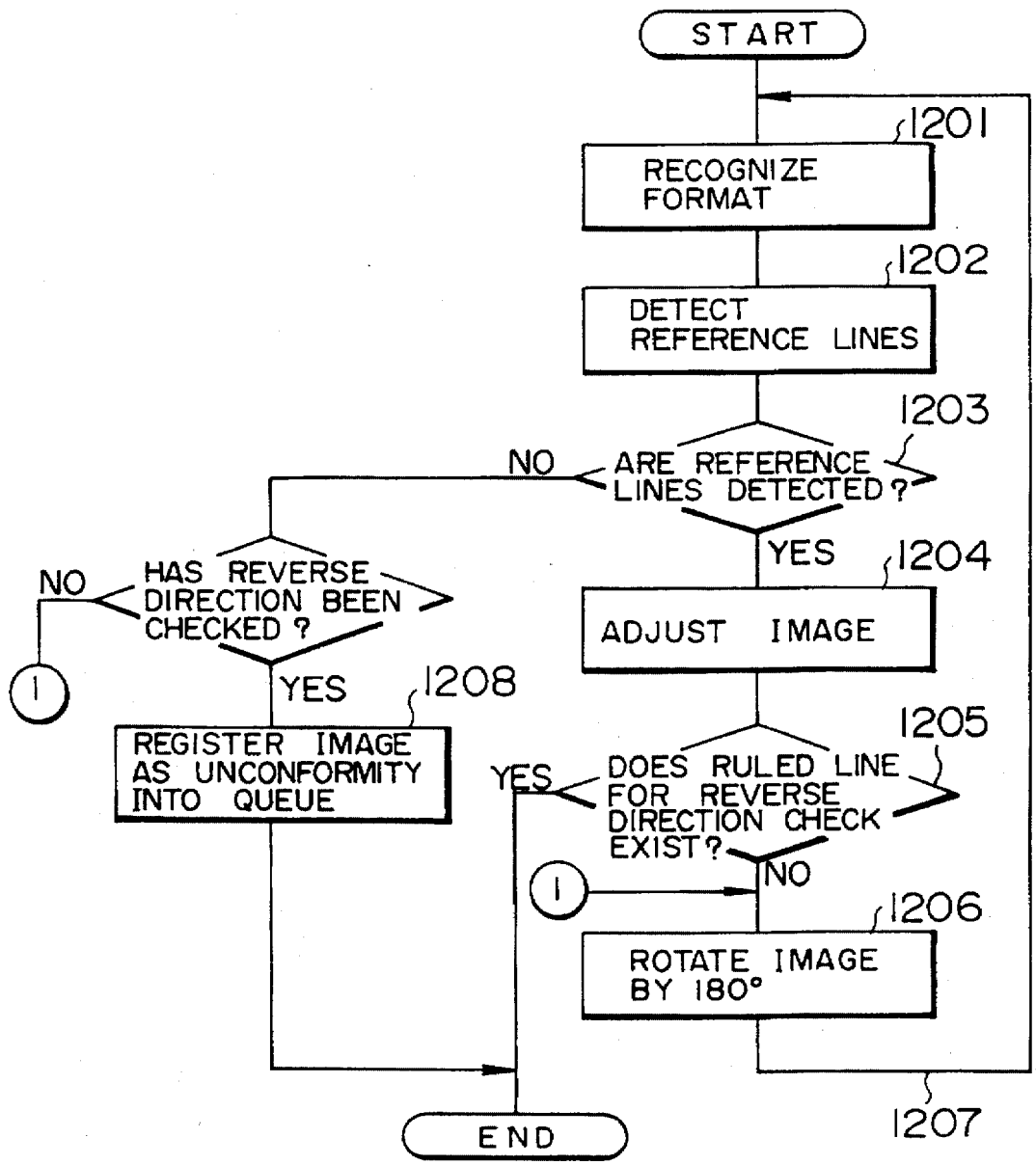
FIG. 12 is a flow chart of image adjustment processing.

FIG. 12 shows a flow chart of the image adjustment processing. In step 1201, ruled lines are recognized, in a manner similar to that upon definition, by the method disclosed by the above-mentioned U.S. Ser. Nos. 07/550,521 and 07/689,071. In step 1202, ruled lines as reference lines are detected from among the recognized ruled lines on the basis of the reference line information stored. In the case where the reference lines are detected (step 1203), the adjustment for the deviation of an image is made in step 1204 on the basis of the stored reference line position information and position information of reference lines on an input image. After adjustment, the examination is made of whether or not a ruled line for reverse direction check exists at a corresponding position (step 1205). If the ruled line for check does not exist, the image is rotated by 180° in step 1206 and the flow returns to step 1201 to repeat the format recognition processing and the subsequent processings. When reference lines are not detected in step 1203, the image is rotated by 180° and the flow returns to step 1201 to repeat the format recognition processing and the subsequent processings. Nevertheless, when reference lines are not detected, the image is stored as image unconformity into a queue determined by a user or the image or a reply of image unconformity is returned to the sender facsimile.

Figure 13:
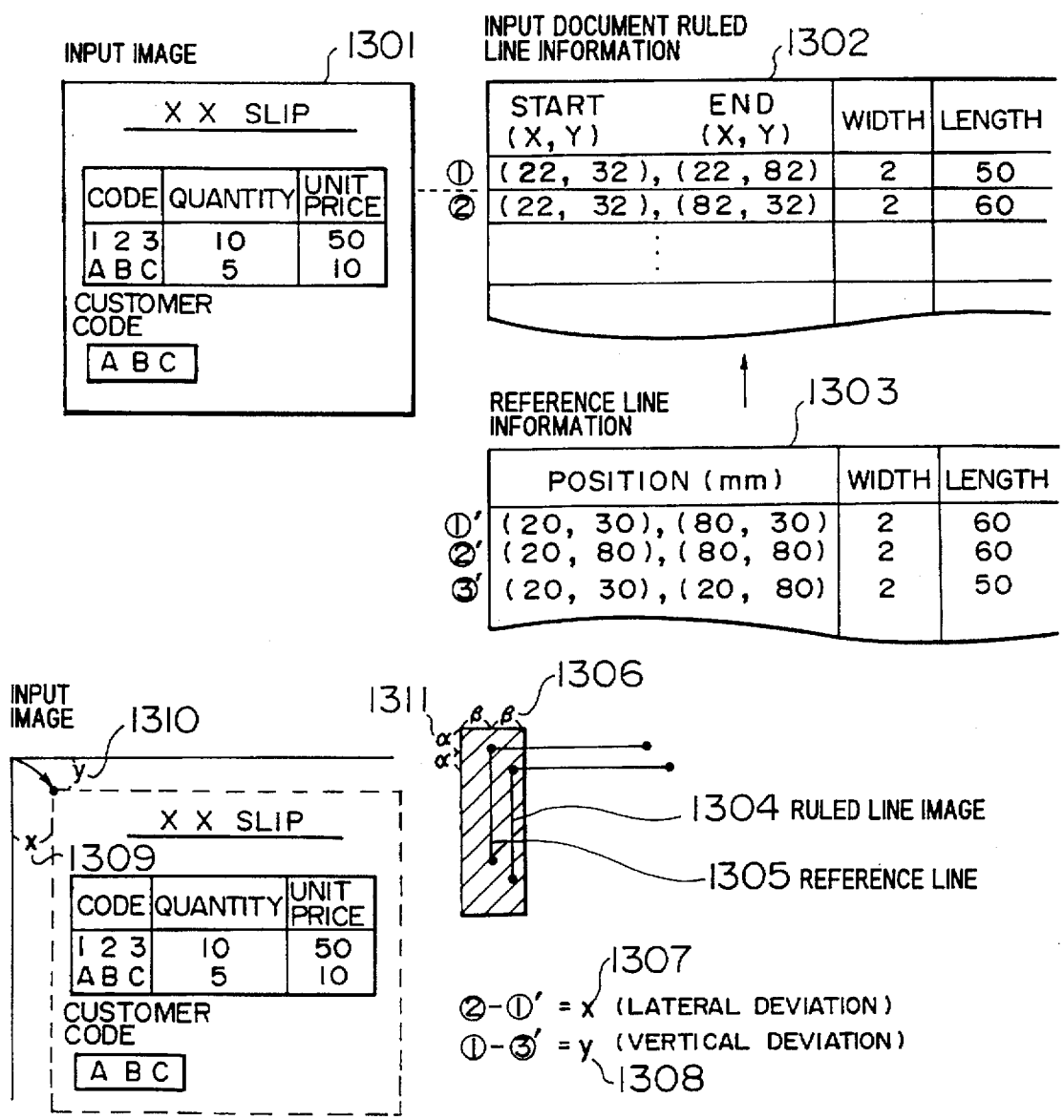
FIG. 13 is a diagram for explaining the determination of the deviation of an input image.

FIG. 13 is a diagram for explaining the determination of the deviation of the input image. Ruled line information 1302 is recognized from a document image 1301 and the recognized information 1302 is searched for the same ruled line as reference line information 1303 stored. The search is made by moving position information of a reference line 1305 in a range of a value 1311 or α in both the upward and downward directions and by a value 1306 or β in both the right and left directions to examine whether or not the moved reference line coincides with a ruled line 1304 of the document image. 1 of the reference line information 1303 coincides with 2 of the ruled line information 1302, and 3 of the information 1303 coincides with 1 of the information 1302. A difference between 2 and 1 and a difference between 1 and 3 are lateral and vertical deviations 1307 and 1308, respectively. Based on these deviations, the input image is wholly adjusted with respect to position information in the ruled line information, as shown by 1309 and 1310. After adjustment, the examination is made of whether or not a ruled line for reverse direction check exists.

Figure 14:
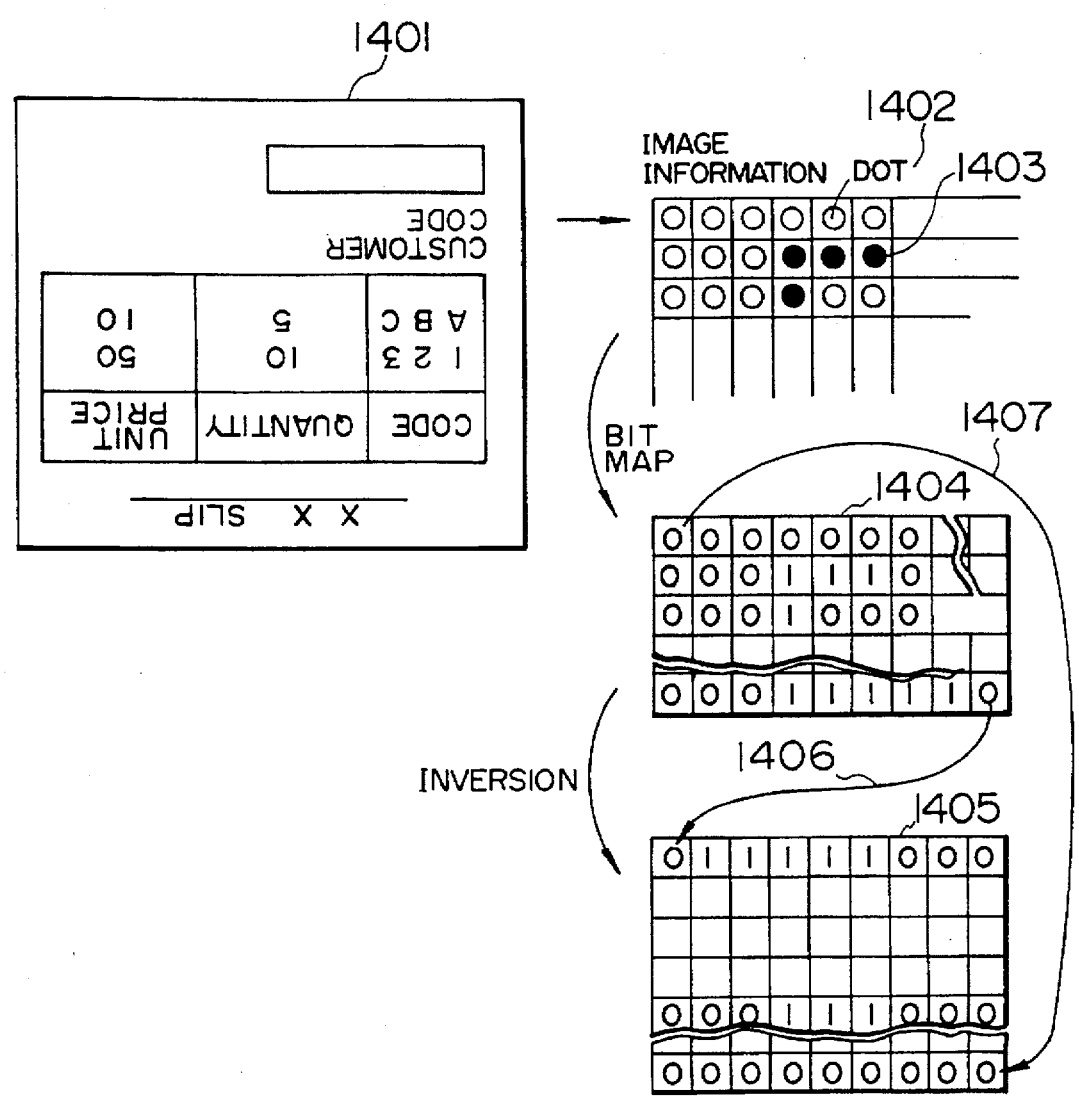
FIG. 14 is a diagram for explaining processing for inverting an image after a reverse direction has been detected.

FIG. 14 shows a processing for inverting the image after the reverse direction check has been made. An image 1401 input in a reverse direction includes block dots 1403 and white dots 1402 which form a bit map 1404 as image information. If the reverse direction has been recognized, the bit map 1404 is rotated by 180° so that the last bit of the bit map 1404 is moved to the leading bit of the bit map 1405 as shown by reference number 1406 and the leading bit of the bit map 1404 is moved to the last bit of the bit map 1405 as shown by reference numeral 1407. The image thus rotated is subjected to the recognition processing again.

Figure 15:
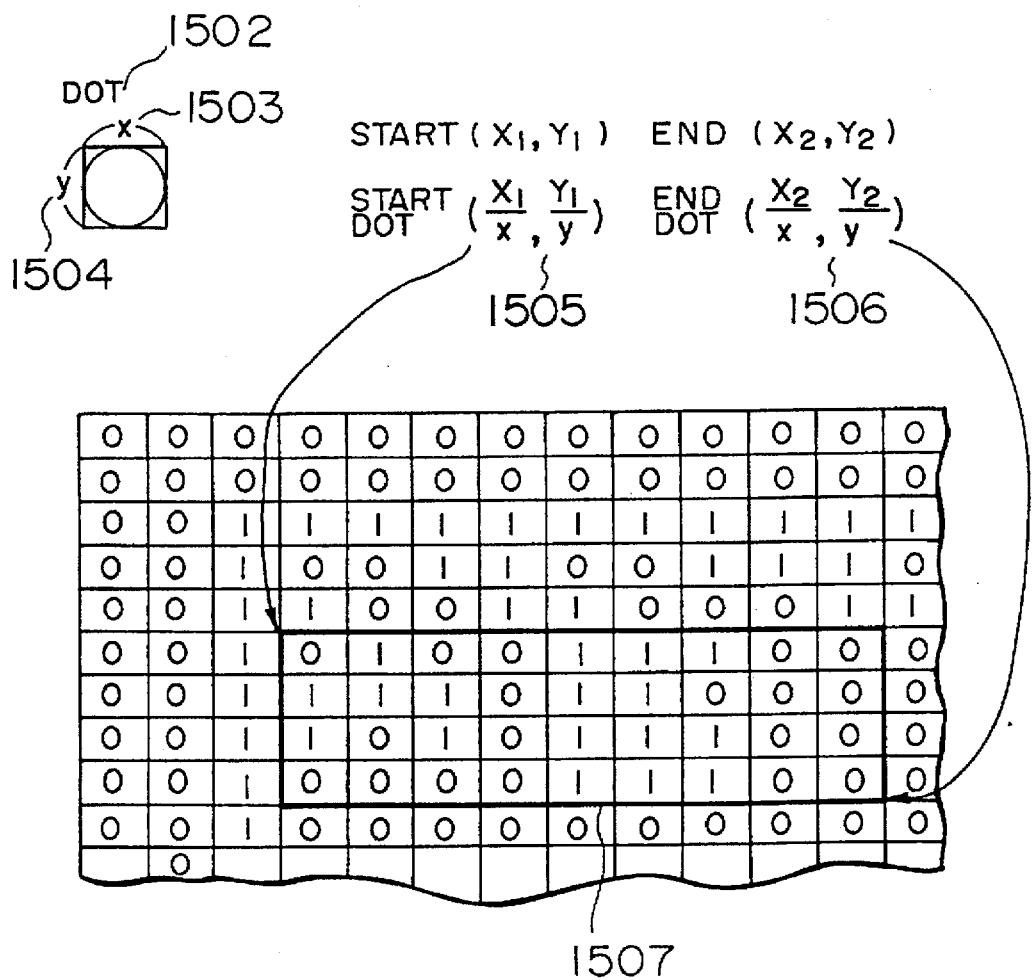
FIG. 15 is a diagram for explaining the determination of handwritten character portions from the contents of an image.

FIG. 15 is a diagram for explaining processing for determining a handwritten character image area from an aligned or adjusted image on the basis of the handwritten character input area information. A handwritten character input area in bit map information of the image is determined in accordance with expressions 1505 and 1506 for calculation from start and end positions 1501 of the handwritten character input area information and the vertical and lateral sizes 1504 and 1503 of a dot which forms the image. Characters are recognized from the bit map information in the determined area and are converted into code data.

FIG. 16 shows a format of the recognition result. A leading portion includes a state indication field 1602 representative of the presence/absence of an unrecognizable character. The field 1602 is followed by a field 1601 in which a sender facsimile number is set and files 1603, 1604 and 1605 in which an item name, the number of digits and code data obtained by conversion following the recognition are set, respectively. When there is an unrecognizable character, a character or symbol 1606 such as "?" is set.

Figure 17:
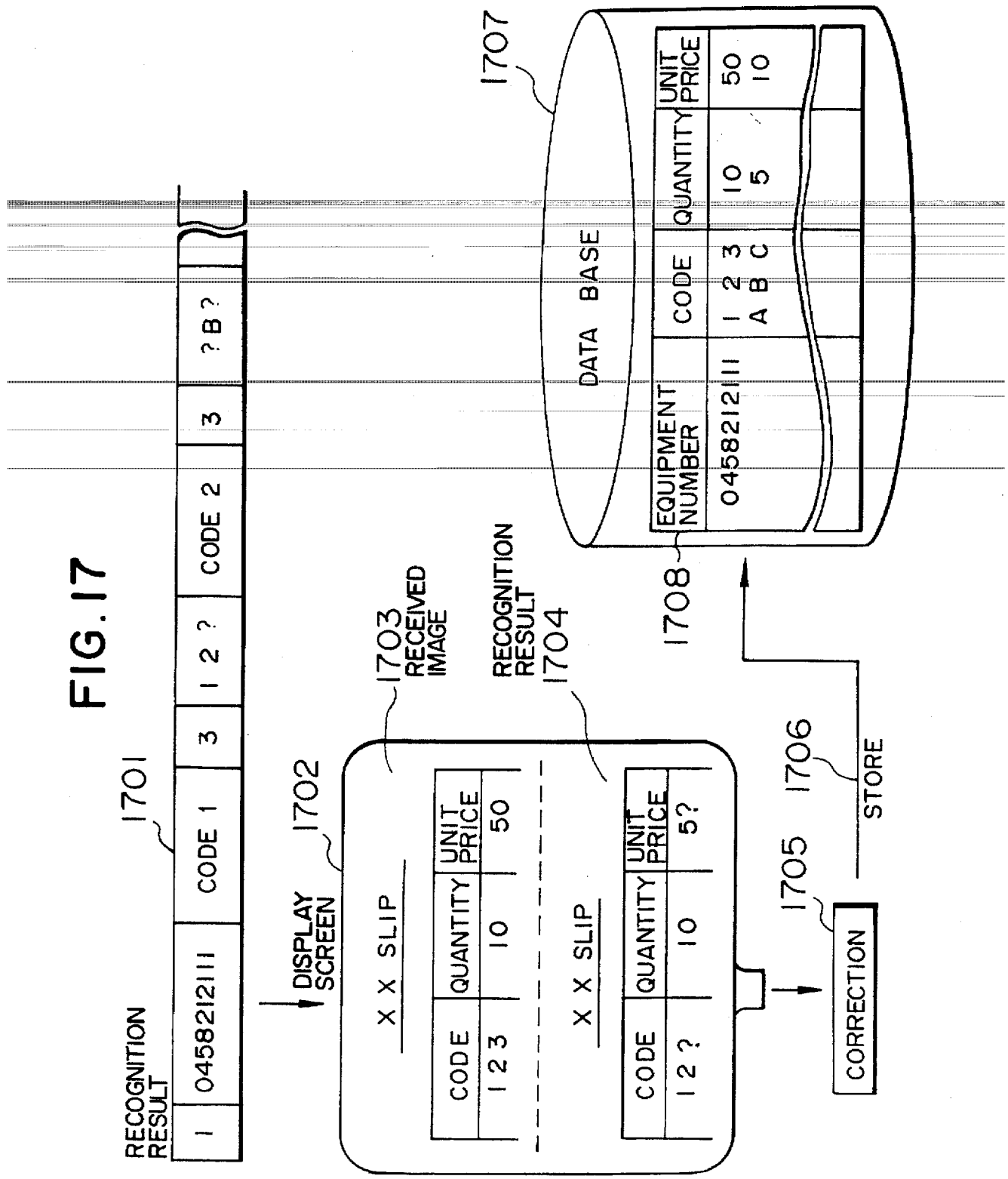
FIG. 17 shows the display of the recognition result on a display screen.

FIG. 17 is a diagram for explaining the display of the recognition result on a display screen. On upper and lower half portions of a display screen 1702 are respectively displayed a received image 1703 and the recognition result or a representation 1704 in which a screen display format produced by the screen display format producing means (or step) 222 is filled with code data of the recognition result. An operator performs a processing 1705 for making confirmation/correction while watching the result as displayed and performs a processing 1706 for storage into a data base 1707. At this time, a sender facsimile number is set into a record 1708 of the data base together with the recognition result data. In the user's business related processing (applications), it is possible to make the transmission of data by use of this facsimile number.

Figure 18:
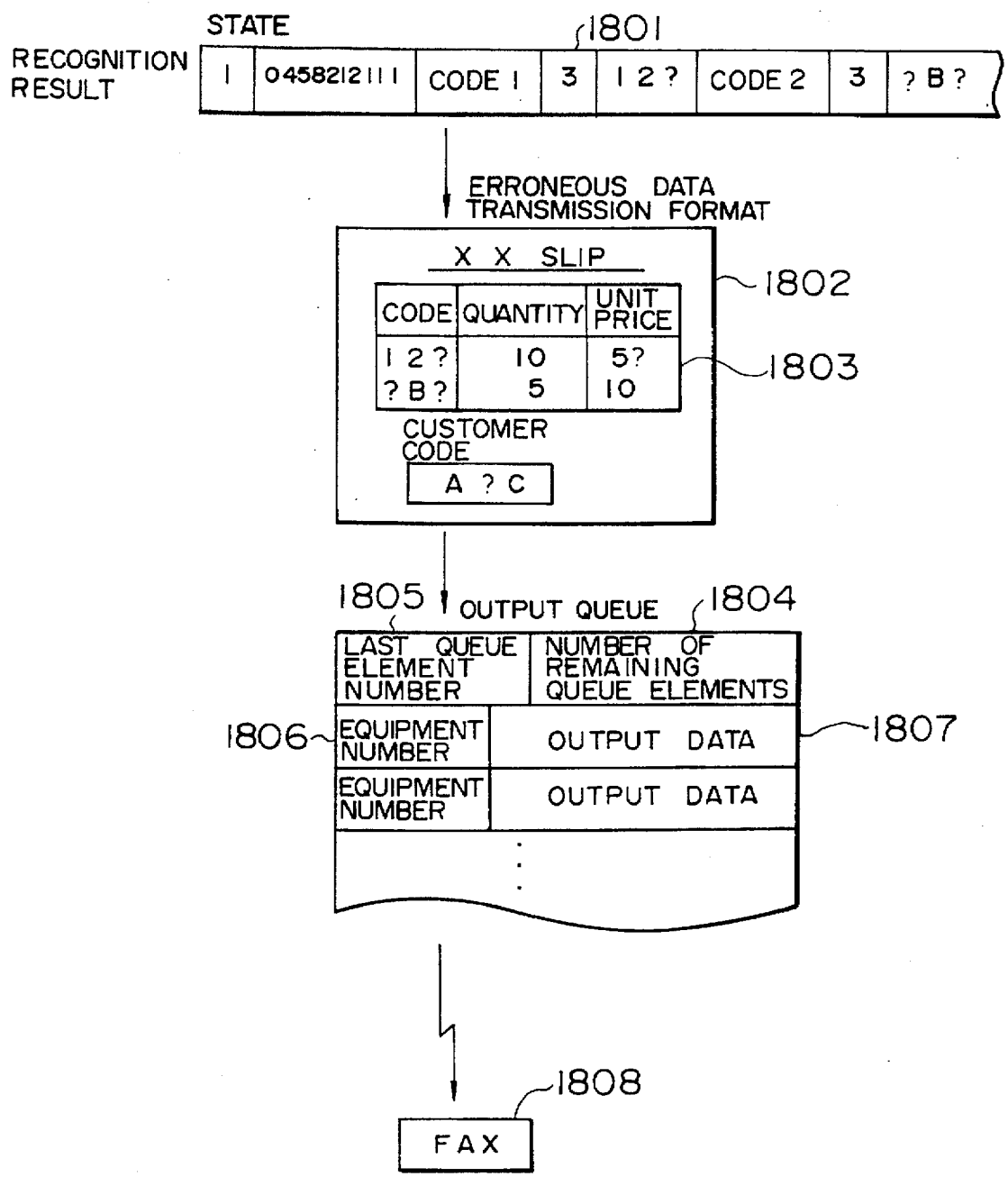
FIG. 18 is a diagram for explaining processing for returning an image and the recognition result to a sender facsimile.

FIG. 18 schematically shows a processing for returning an image and the recognition result to a sender facsimile when there is an unrecognizable character. A transmission (or reply) format 1802 is produced from the recognition result 1801. The unrecognizable character is printed or represented by a character "?" 1803. Reference numeral 1804 represents the contents of an output queue for transmission to sender facsimiles. Reference numeral 1805 represents a queue element number of the last queue element registered. A sender facsimile number 1806 and output data 1808 are set into the output queue. After registration into the output queue, the output data is transmitted or returned to a sender facsimile 1808.

Figure 19:
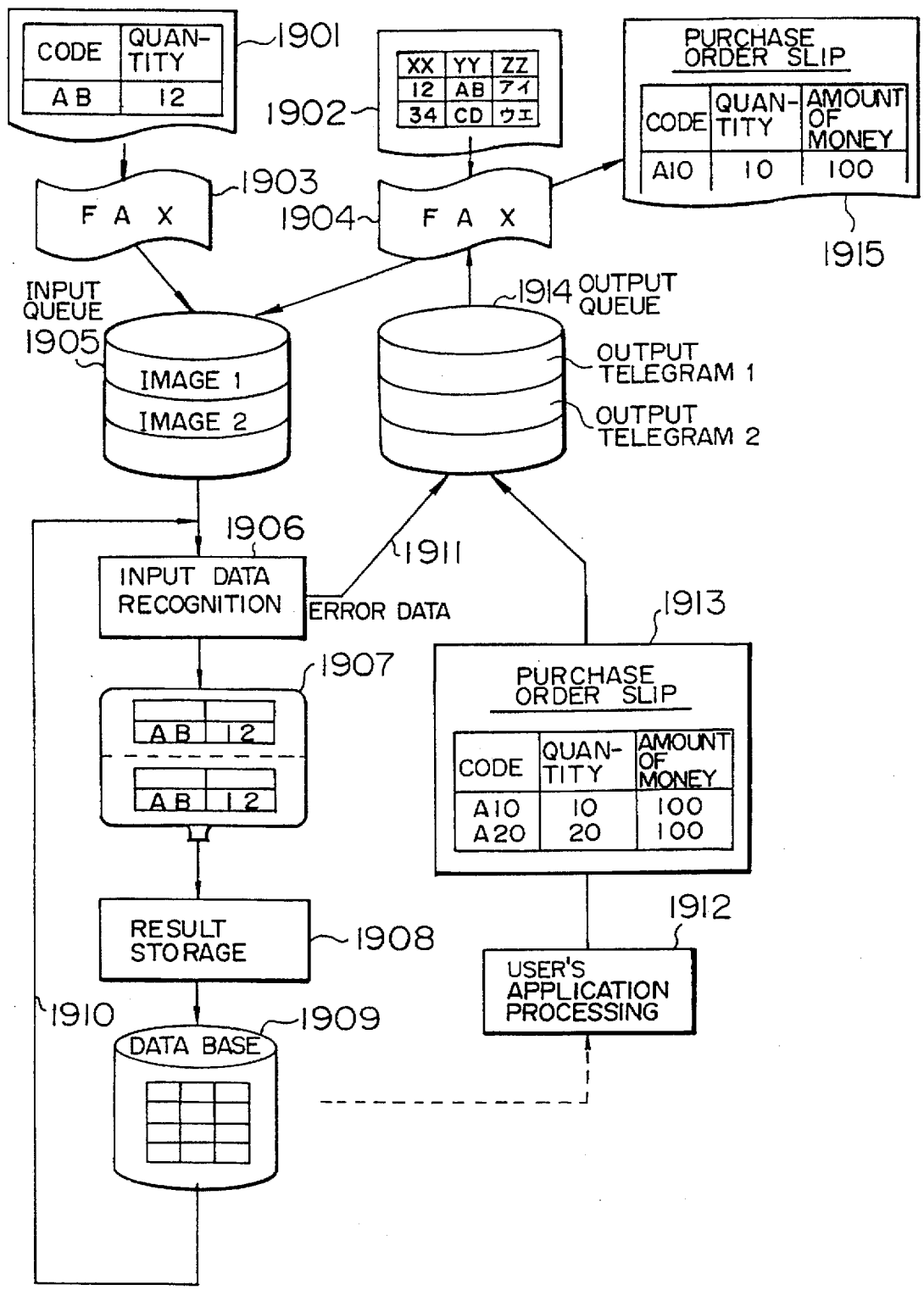
FIG. 19 is a diagram showing one example of the operational configuration of the present invention.

FIG. 19 shows an example of the operational configuration of the present invention. Documents 1901 and 1902 input from facsimile terminals 1903 and 1904 of, for example, branch offices are received and stored as images 1 and 2 into an input queue 1905. First, handwritten characters in the image 1 are recognized by an input data recognition section 1906, and correction/confirmation is made on the display screen of a display device 1907. Code data of the recognition result is stored into a data base 1909 by a result storage section or processing 1908. Next, the flow goes through a loop 1910 to a processing for the next image 2 to repeat a processing similar to the above processing. Thereafter, in a user's business related processing 1912, a document such as a purchase order slip 1913 produced using the data base 1909 is facsimile-output through an output queue 1914 in a form as shown by reference numeral 1915. If there is an unrecognizable character, the input data recognition section 1906 sends back error data 1911 for indication to the sender facsimile.

Next, an embodiment, in which the present invention is applied to inventory management, will be explained with reference to FIGS. 20 and 21. The explanation will be made of an inventory work as one example in the case where a center such as a head office transmits an instruction for a work through facsimile to a plurality of branches such as branch offices and confirms the result of the work.

Figure 20:
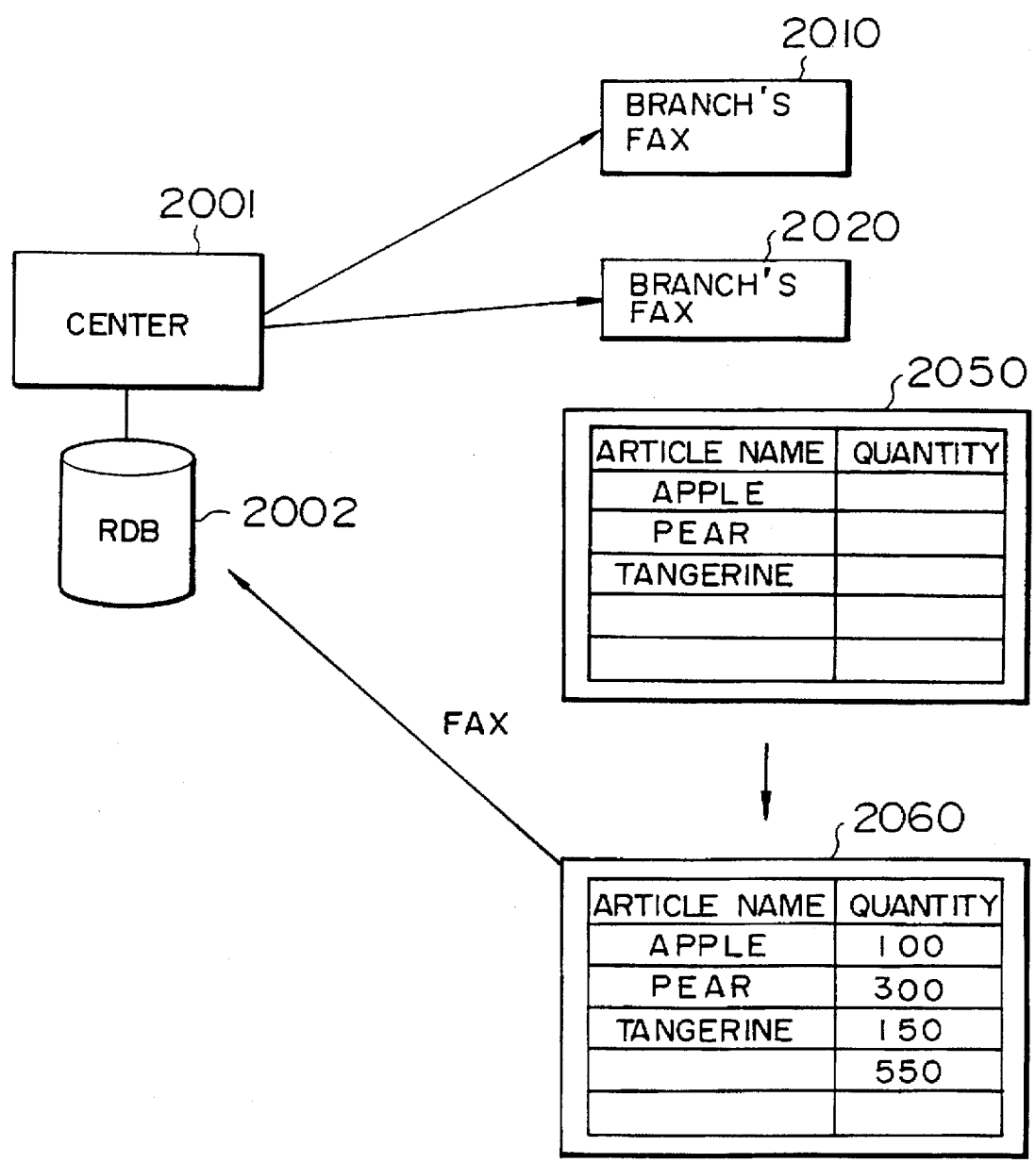
FIG. 20 is a diagram for explaining an embodiment in which the present invention is applied to inventory management.

Referring to FIG. 20, a center 2001 is provided with a file 2002 for storing inventory ledgers and the result of totalization for all branches and periodically or occasionally transmits a document form with an inventory list described thereon to facsimile terminals 2010, 2020, . . . of the branches through a subscriber communication line. In each branch, the present value such as quantity of each item of the stock or stored articles is described on a facsimile paper in the transmitted document form to make an inventory result document 2050. The branch sends back the document 2060 to the file 2002 of the center 2001 through the facsimile line.

Figure 21:
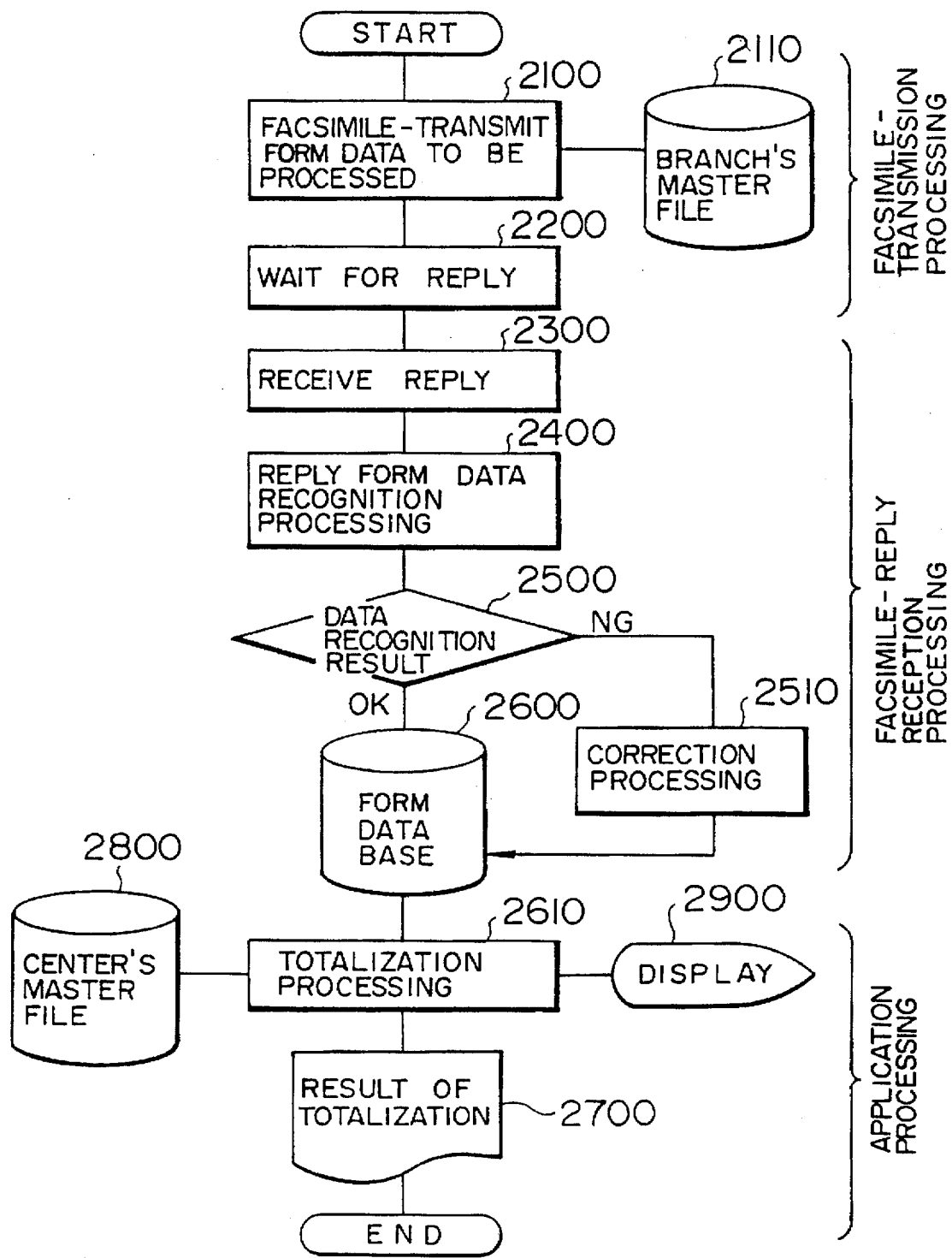
FIG. 21 is a flow chart showing a method for operation of the inventory management in the embodiment shown in FIG. 20.

A flow chart of a processing performed by the center for the inventory work is shown in FIG. 21. This processing can be performed using the document processing which follows the operational aspect explained in conjunction with FIG. 19.

The center 2001 transmits an inventory form or blank form through a facsimile line to a master file 2110 of each branch which handles the stock (step 2100). The center waits for a reply from each branch or the sending-back of the form (step 2200).

In each branch, the form or blank form transmitted from the center is printed out from the file 2110 or is directly received from the facsimile line in the form of a facsimile-output paper. The result of stocktaking is described on the blank form to make a reply form. The reply form is facsimile-transmitted as a reply to the center.

When receiving the reply form, the center stores form data as image data into an input buffer so that form data from the branches 2010 and 2020 are stored as images 1 and 2 (step 2300). Subsequently, each of the images 1 and 2 is input to a computer of the center so that a processing for recognition of the format of reply form data and character/numeral data is performed using a document knowledge base (step 2400). In a step 2500, the judgement is made of whether the result of recognition is good or bad (OK/NG). If the result is good, the result is buffered for a business related processing. Usually, the result of recognition is stored into a data base 2600. If the result is bad, correction processing by an operator or a correction processing through a request to the sender for retransmission is performed (step 2510) and the corrected data is buffered in preparation for the business related processing.

In the business related processing, the computer of the center executes a business related processing program to subject the buffered data or the data read from the data base 2600 to a predetermined processing, for example, a predetermined totalization processing (step 2610), thereby obtaining the desired result of totalization of inventory data. The result of totalization is subjected to an output processing including the print-out (step 2700), the storage into a management master file 2800 of the center, and the display on a display screen 2900, thereby completing the business related processing. The printing techniques disclosed in U.S. Ser. No. 07/775,026 filed Oct. 11, 1991 are applicable for printing out the form or the document form, and of which the disclosure is incorporated herein by reference. In the above document processing method, it is not necessary to initially send or deliver inventory forms or blank forms from the center to each branch. Since an instruction for examination or check can be made from the center directly to the branch through the facsimile line and the result of examination can be stored directly into the data file of the center via the facsimile line and through an automated and immediate processing, the transcription at the center or the data entry into the data file becomes unnecessary, thereby attaining a labor saving device.

According to the embodiments of the present invention, since data on documents (or blank forms) from remote places can be processed by a computer in real time and the result of processing can be transmitted to each facsimile, the immediate processing of business related programs becomes possible, thereby making it possible to promptly perform a series or cycle of business program processing. Also, since the cost of transporting documents and the input by manual operation become unnecessary, the personal expenditure is greatly reduced. Further, since blank forms to be processed are not special forms and may be general blank forms, no special expenditure for blank forms is required and a change in format of the blank form can easily be made. Since special blank forms are not required, the present invention can be embodied with no need to change the form of user's business affairs hitherto employed. The description can be made in a free format. Since a deviation correcting function and a reverse direction correcting function may be implemented, the transmission of a document from a facsimile terminal can easily be made with no need of special deliberateness or attention upon facsimile input. Since a spool or buffering function of storing information from facsimile may be implemented, great reduction of a time for use of a communication line as well as reception in the night (or in other words, 24-hour reception) become possible, thereby making an operation by a user very easy.

Many different embodiments of the present invention may be constructed without departing from the spirit and scope of the invention. It should be understood that the present invention is not limited to the specific embodiments described in this specification. To the contrary, the present invention is intended to cover various modifications and equivalent arrangements included within the spirit and scope of the claims.

What is claimed is:

1. A document processing system connected by a communication line for processing facsimile machine transmitted document form data as image information, by using a computer, comprising:

read means for initially reading form information of a first form which includes a format having a plurality of vertical and horizontal lines;

recognition and storage means, responsive to said read means, for recognizing positions of border patterns in the format of the first form, based on a knowledge base, generating information defining character input areas on which data is to be recorded and storing the recognized positions of border patterns and the generated information, wherein said recognition and storage means includes:
means for selecting either one of a vertical ruled line and a horizontal ruled line which are outermost in image information of the format of the first form are not crossed with another ruled line and registering information regarding the position of the selected ruled line;

comparing means for comparing the positions of border patterns and the character input areas stored in said recognition and store means with image information of a second form having the same format as the first form and input from a facsimile machine, said second form having data recorded thereon, and outputting a comparison result indicating relative positions of border patterns and character inputs areas of said first form and said second form, wherein said comparing means includes:
means for determining whether coordinates information for the first form stored in said recognition and storage means exists in the second form,
means responsive to a mismatch of the coordinates information by said determining means for reversing the image information of the second form, and
means for correcting offsets and skews of image information between the first form and the second form by performing parallel translation vertically and horizontally based on information set as a reference line;

character recognition means responsive to said comparison result for recognizing character data in character input areas at positions identified on said second form; and conversion means for converting the character data recognized by said character recognition means into a code data.

2. A document processing system according to claim 1, further comprising:

means for storing the code data from said conversion means in a data base;

means for performing a user's application processing based on the code data stored in said code data storing means;

means for storing a result of the user's application processing obtained by said performing means in a data file; and means for returning the result stored in said user's application processing result storing means indicating that data in the second form is not recognizable back to the facsimile machine from which the second form has been sent, using the number of the facsimile machine.

3. A document processing system according to claim 1, further comprising:

means for rotating the second form by 180° in response to detection of the second form being in a reverse direction based on a positional relation between the border patterns and ruled lines of the image information of the second form.

4. A document processing system according to claim 1, further comprising:

means for detecting the input of a document form in a reverse direction from the contents of a facsimile input image of the document form, rotating the image of the document form by 180° and outputting the rotated image, said recognizing means recognizing an output image from said rotated image.

5. A document processing system according to claim 1, wherein said document data transmitted via said facsimile machine has a sender facsimile number and the document processing system further comprises:

producing means for producing, when said recognizing means detects unrecognizable data in said document data, error data reply information with reference to said sender facsimile number; and responding means for responding to said producing means to automatically make a request to the sender for retransmission of document data referred to by the error data reply information.

6. A document processing system according to claim 1, further comprising:

means for displaying a linking scroll for dividing an image portion and a conversion result portion on a screen to permit the conversion result to be confirmed and corrected on the screen.

7. A document processing system connected by a communication line for processing form document data as image information transmitted via a facsimile machine, using a computer, comprising:

means for sending a first document form which includes a format having horizontal and vertical lines and on which no data is recorded from the computer to a facsimile machine;

means for recording data according to said format on the sent first document form and returning said data recorded according to said format on said first document form and data of said format from said facsimile machine to the computer as a second document form, wherein said means for recording data includes:
means for selecting either one of a vertical ruled line a horizontal ruled line which are outer most in image information of the format of the first document form and are not crossed with another ruled line and registering information regarding information of the position of the selected ruled line;

recognition means for recognizing said format having horizontal and vertical lines and character data contained in the second document form based on a knowledge base, wherein said recognition means includes:
means for determining whether recorded coordinates information for the first document form exists in the second document form,
means responsive to a mismatch of the coordinates information by said determining means for reversing the image information of the second document form, and means for correcting offsets and skews of image information between the first document form and the second document form by performing parallel translation vertically and horizontally based on information set as a reference line; and conversion means for converting the character data recognized by said recognition means into a code data.

8. A document processing system according to claim 7, further comprising:

means for storing the code data in a data base;

means for performing a user's application processing based on the code data stored in said code data storing means; and means for storing the result of the user's application processing obtained by said performing means in a data file.

9. A method of processing a facsimile machine transmitted document image by use of a computer, said method comprising the steps of:

reading, in advance form information of a first form which includes a format having vertical and horizontal lines and on which no data is recorded;

recognizing positions of border patterns and characters in the format of the first form based on a knowledge base, including the step of selecting either one of a vertical ruled line and a horizontal ruled line which are outermost in image information of the format of the first form and are not crossed with another ruled line;

generating information defining character input areas on which data is to be recorded based on the recognized border patterns;

comparing positions of the recognized border patterns and character input areas and positions of border patterns and character input areas of image information of a second form having the same format as the first form, input from the facsimile machines, said second form having data recorded thereon, and outputting a comparison result based on the comparison, said comparing step includes:

determining whether recorded coordinates information for the first form exists in the second form, responsive to a mismatch of coordinates by said determining step, reversing the image information of the second form, and correcting offsets and skews of image information between the first and second forms by performing parallel translation vertically and horizontally based on information set as a reference line;

recognizing character data in the character input areas of said second form based on said comparison result; and converting the recognized character data into code data.

10. A method according to claim 9, further comprising the steps of:

storing the code data in a data base;

performing application processing based on the code data stored in said data base; and storing a result of the application processing in a data file.

11. A method according to claim 10, further comprising the step of:

returning the result of the application processing stored in the data file to the facsimile machine from which the second form has been sent using a facsimile number.

12. A method according to claim 9, further comprising the step of:

correcting offsets and skews of image information between the first and second form, using the positions of ruled lines of the first form as a reference.

13. A method according to claim 9, further comprising the steps of:

determining whether or not the second form is in a reverse direction based on a positional relation between the border patterns and ruled lines of the image information of the second form; and rotating the second form by 180° if the second form is determined to be in the reverse direction.

14. A method according to claim 9, wherein said code data buffering step includes the step of:

displaying received document image and document data based on the information of said knowledge base and said code data on a display screen to interactively correct the document data.

15. A method according to claim 9, further comprising the step of:

displaying a linking scroll for dividing an image portion and a conversion result portion on a screen to permit the conversion result to be confirmed and corrected on the screen.

16. A document processing system connected by a communication line for processing document data of a facsimile machine transmitted form containing ruled lines by using a computer, comprising:

register means for registering ruled line information obtained from said form, said ruled line information representing vertical and horizontal lines defining document data input areas, wherein said register means includes:

means for selecting either one of a vertical ruled line and a horizontal ruled line which are outermost and image information of said form and are not crossed with another ruled line and registering information regarding the position of the selected ruled line; and recognition means for determining offsets and skew of a facsimile machine transmitted form having ruled lines by referring to said ruled line information registered in said register means as a reference to correct positions of document data input areas of said facsimile machine transmitted form based on said offsets and skew and recognizing document data in the corrected document data input areas, wherein said recognition means includes:

means for determining whether coordinates information corresponding to the ruled line information registered in said register means exists in the facsimile machine transmitted form, means responsive to a mismatch of the coordinates information by said determining means for reversing the image information of the facsimile machine transmitted form, and means for correcting offsets and skews of image information between the ruled line information registered in said register means and the facsimile machine transmitted form by performing parallel translation vertically and horizontally based on information set as a reference line.

17. A system according to claim 16, further comprising:

conversion means for converting document data recognized by said recognition means into a code data; and means for performing a user's application processing based on said code data from said conversion means.

18. A system according to claim 17, further comprising:

means for sending a result of the user's application processing to the facsimile machine which transmitted said facsimile machine transmitted form.

19. A system according to claim 16, further comprising:

means for detecting that said facsimile machine transmitted form having ruled lines is in a reverse direction and thereby rotating said facsimile machine transmitted form by 180 degrees for allowing recognition of the facsimile machine transmitted form in its proper direction.

20. A system according to claim 17, further comprising:

means for scrolling an image portion and conversion result portion on a screen together to permit a user to confirm and modify the code data from said conversion means on the screen.

* * * * *